United States Patent [19]
Kessler

[11] 4,297,530
[45] Oct. 27, 1981

[54] ELECTRONICS PACKAGE

[75] Inventor: Bayard F. Kessler, Woodland Hills, Calif.

[73] Assignee: Novation, Inc., Calif.

[21] Appl. No.: 971,538

[22] Filed: Dec. 20, 1978

[51] Int. Cl.$^3$ ............................................ H04M 11/00
[52] U.S. Cl. ................................ 179/2 C; 174/52 R
[58] Field of Search .................... 179/1 C, 2 C, 2 DP; 361/389, 395, 399, 415; 174/52 R

[56] References Cited

U.S. PATENT DOCUMENTS 4,158,106  6/1979  Mason ................................. 179/2 C

OTHER PUBLICATIONS

Livermore Data Systems Inc., ad for the 71 Series Data Modems, Jan. 6, 1971.

Primary Examiner—Joseph A. Popek
Attorney, Agent, or Firm—Blakely, Sokoloff, Taylor & Zafman

[57] ABSTRACT

An Electronics Package for providing a low cost enclosure of good esthetic and functional character. The package is formed from an extrusion, preferably a plastic extrusion, having one or more pairs of slots on the inner surface thereof for receiving and supporting the edges of a printed circuit board. End caps on each end of the extrusion complete the enclosure with the end caps being retained in place by any of a variety of techniques. By fastening the printed circuit board or printed circuit boards to at least one of the end caps, no other circuit board retention within the central extruded section is required. The end caps may be configured so as to have openings to expose or make accessible switches, connectors and the like mounted on the printed circuit board or boards, or to provide access for an edge connector for connecting directly to the printed circuit board. Various embodiments are disclosed, including embodiments for packaging of modems and further including modem packages having adjustable muff spacing.

13 Claims, 16 Drawing Figures

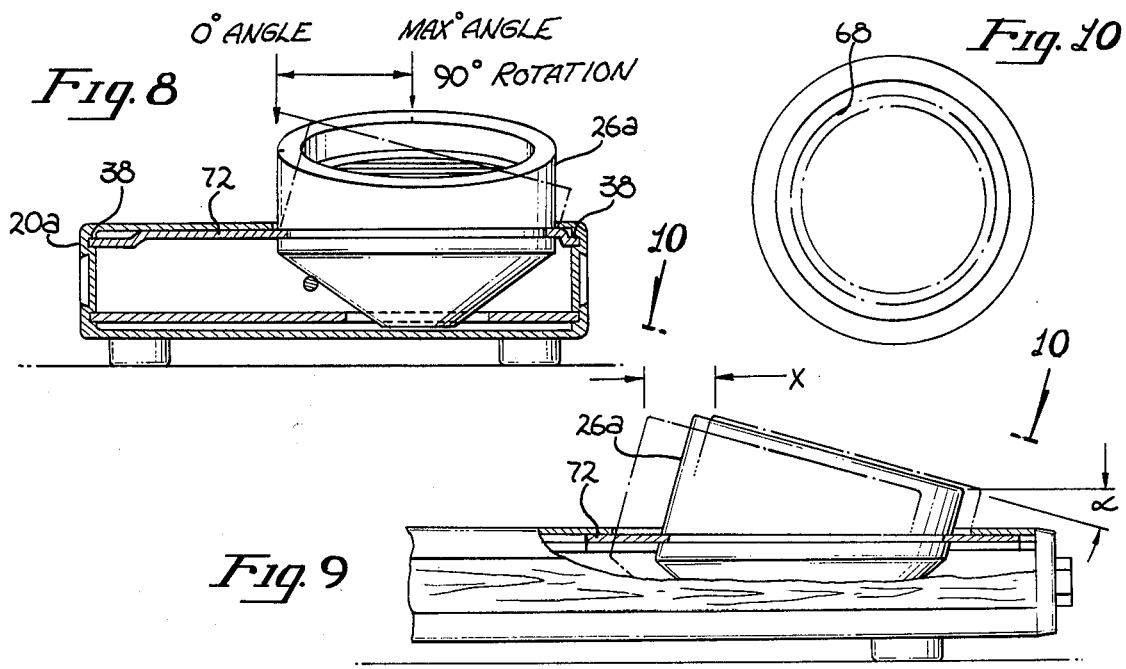
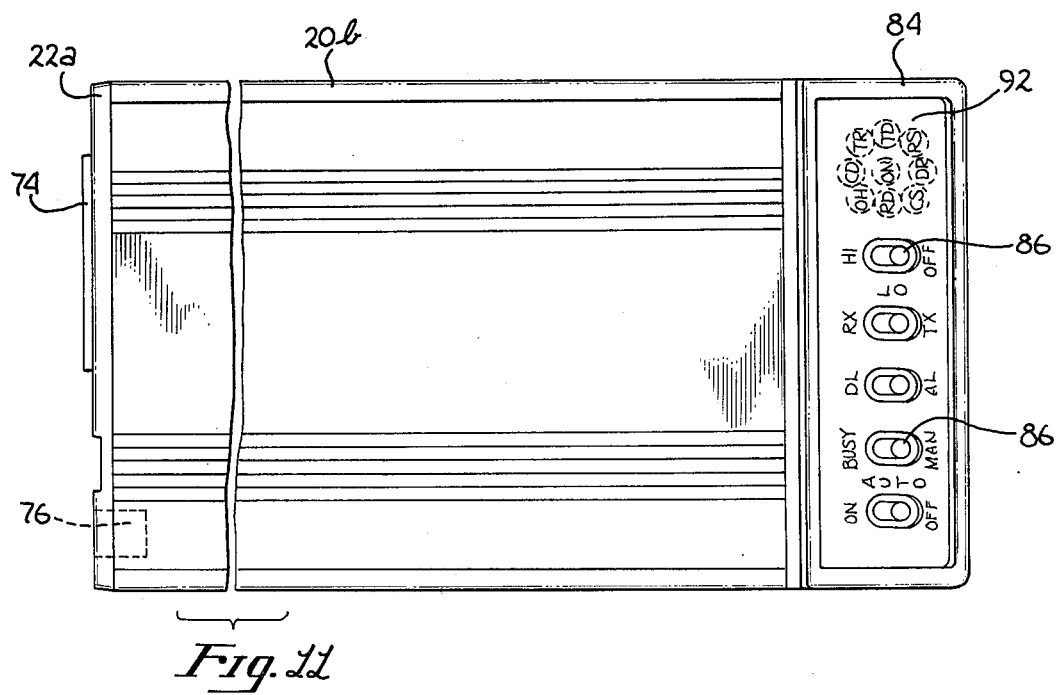
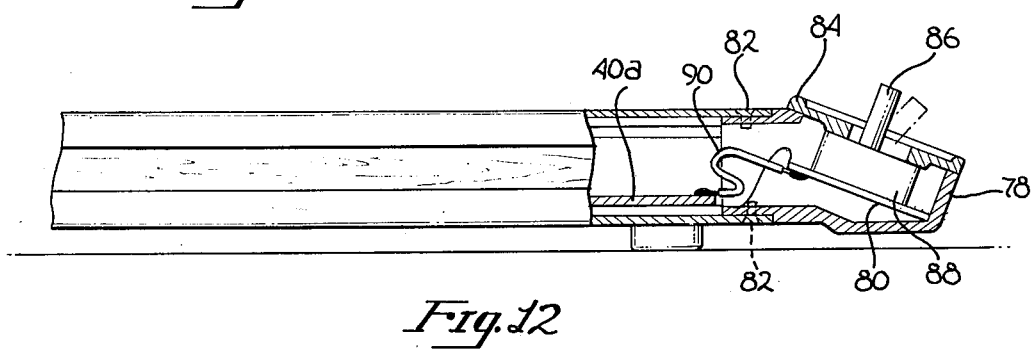

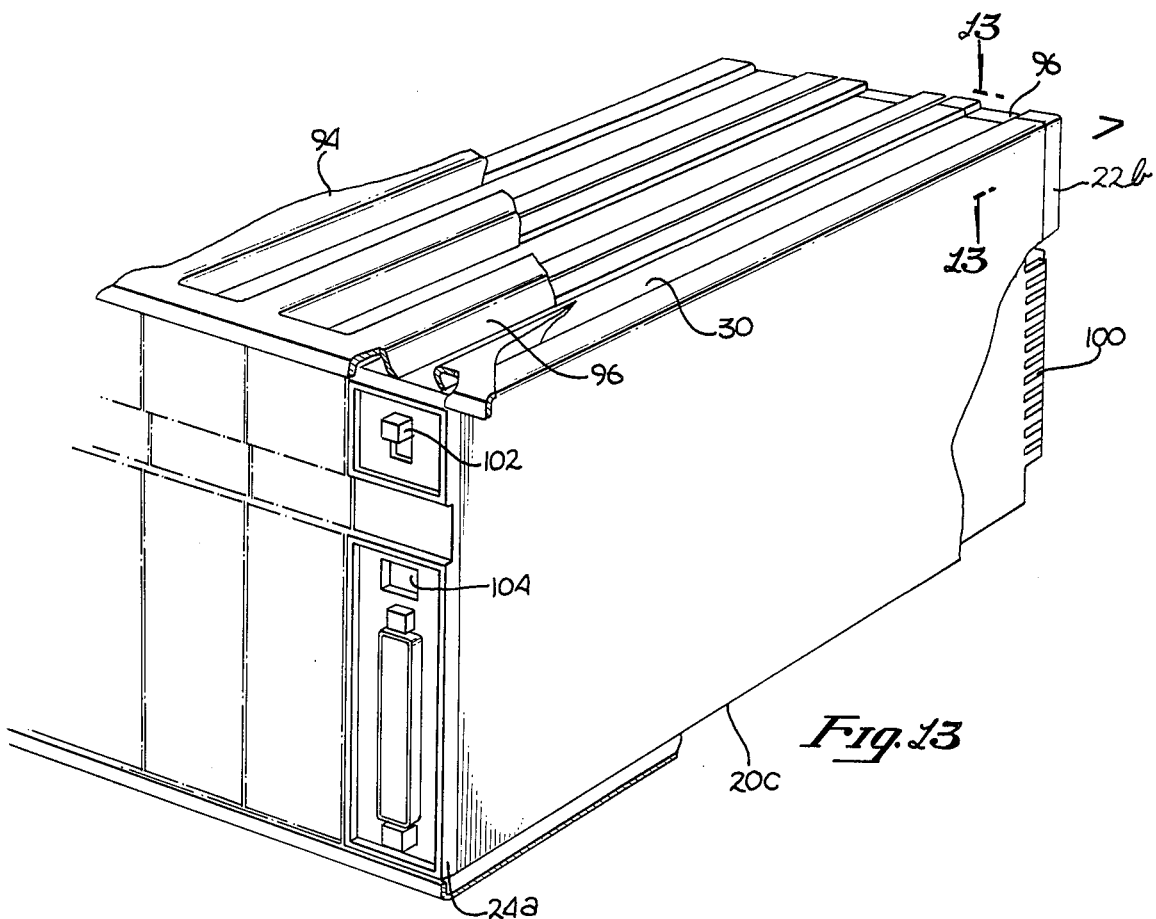
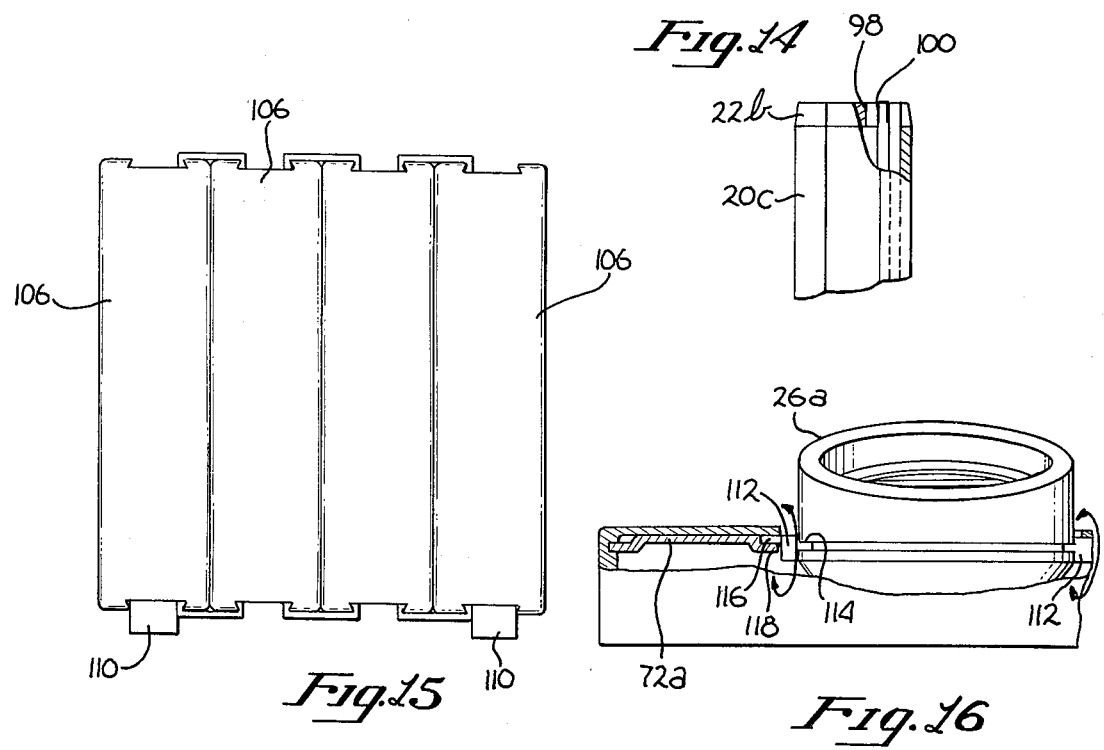

ELECTRONICS PACKAGE

BACKGROUND OF THE INVENTION

1. Field of the Invention

The present invention relates to the field of Electronics Packaging.

2. Prior Art

Printed circuit board construction of electronic circuits has been a standard form of electronic circuit construction for a substantial number of years. The packaging of printed circuit board assemblies, however, is generally not standard, and varies considerably depending upon the nature and end use of the circuit. By way of example, if the circuit is to be used in test equipment or together with other circuits in a bigger assembly, the circuit board may be fastened by screws or other fastening devices to a metal chassis of highly functional, though of little esthetic character. If on the other hand the circuit is to be used in a free standing end product, the printed circuit board will generally be coupled directly or indirectly to some form of esthetically pleasing enclosure frequently being formed by injection molding or vacuum forming techniques. In the first type of packaging described, a high degree of functionality is achieved at the expense of esthetics. In fact, in modern-day small computer systems many functional circuits are sold in the printed circuit board assembly form without any enclosure, which circuits are used by the end user by plugging them into appropriately disposed edge connectors within the main computer chassis. In the second type of enclosure whereby substantial esthetic character is achieved, such packaging is relatively expensive because of the cost of tooling and/or individual enclosure parts cost, with significant assembly commonly being associated therewith before the esthetic and functional package is achieved. Further, such packaging techniques generally lack significant versatility, as enclosure tooling is generally applicable only to an enclosure of one size and appearance. The purpose of the present invention is to provide a low cost electronics package and packaging technique which will yield a package of high esthetic character, great versatility and applicability to both a free standing package and as part of larger electronic systems in a rack, panel or chassis mount.

Various types of printed circuit board supports have been proposed in the past. By way of example, printed circuit board supports utilizing slots on adjacent walls of some form of at least partial enclosure are disclosed in U.S. Pat. Nos. 3,265,935; 3,288,301; 3,813,582; 4,002,953 and 4,004,194. The printed circuit board supports of these patents, however, generally provide side support for the printed circuit board but do not themselves form complete enclosures providing access to switches, connectors, etc. Further, of course, they are supports of little esthetic character. As it would appear, they are intended for mounting within still another chassis or enclosure giving the suitable esthetic character for the particular application. In U.S. Pat. No. 3,265,935, methods of closing the ends of the support are disclosed, though here again such closures are without esthetic merit and do not cooperate with the circuit packaged therein for connection, control functions, etc.

BRIEF SUMMARY OF THE INVENTION

An Electronics Package for providing a low cost enclosure of good esthetic and functional character. The package is formed from an extrusion, preferably a plastic extrusion, having one or more pairs of slots on the inner surface thereof for receiving and supporting the edges of a printed circuit board. End caps on each end of the extrusion complete the enclosure with the end caps being retained in place by any of a variety of techniques. By fastening the printed circuit board or printed circuit boards to at least one of the end caps, no other circuit board retention within the central extruded section is required. The end caps may be configured so as to have openings to expose or make accessible switches, connectors and the like mounted on the printed circuit board or boards, or to provide access for an edge connector for connecting directly to the printed circuit board. Various embodiments are disclosed, including embodiments for packaging of modems and further including modem packages having adjustable muff spacing.

BRIEF DESCRIPTION OF THE DRAWINGS

FIG. 8 is a partial cross section taken along line 8—8 of FIG. 7.

FIG. 9 is a partial cross section taken along line 9—9 of FIG. 7.

FIG. 10 is a top view of one of the muffs.

FIG. 11 is a top view of a still further alternate embodiment of the present invention.

FIG. 12 is a partial cross section of the embodiment of FIG. 11.

FIG. 13 is a perspective view of a still further embodiment of the present invention as it may be used in a panel mount.

FIG. 14 is a partial cross section illustrating the provision for edge connection to the back of the embodiments of FIG. 13.

FIG. 15 is a schematic illustration of the manner in which units of the present invention may be coupled together.

FIG. 16 is a partial cross section illustrating an alternate design for gimbaling the muffs for angular adjustment.

DETAILED DESCRIPTION OF THE INVENTION

Figure 1:
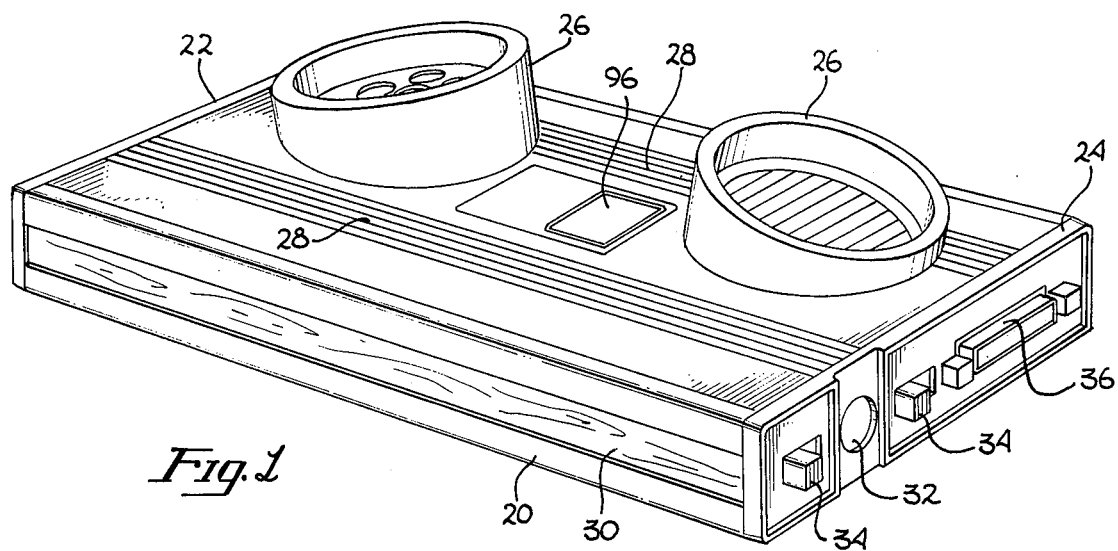
FIG. 1 is a perspective view of one embodiment of the present invention.

First referring to FIG. 1, a perspective view of a preferred embodiment of the present invention may be seen. For purposes of specificity, the invention is disclosed with respect to the packaging of acoustic modems, that is modulator-demodulator sets for digital communication over phone lines. In that regard all embodiments of the present invention will be disclosed and described herein with respect to modems, though it is to be understood that the invention is by no means so limited.

The modem of FIG. 1 is characterized by a central body section 20 enclosed at the ends thereof by end caps 22 and 24. Projecting from the top of the body section 20 are a pair of rubber muffs 26 enclosing electromagnetic transducers for the acoustic coupling with the phone receiver. In the finished form, as shown in FIG. 1, the central body section 20 is characterized by some appropriate longitudinally directed decorative pattern 28 on the top (and bottom) thereof, and is further provided with a slot 30 at the sides thereof within which a wood grain strip is disposed for further decorative purposes. The cap 22 of this embodiment is merely a closure member, though the cap 24 is provided with suitable openings for connection and control purposes, such as opening 32 for a power connector, openings for control switches 34 and a further opening for connector 36 for input/output connections. (See also FIGS. 2 through 6 for additional views of the modem of FIG. 1.)

Figure 2:
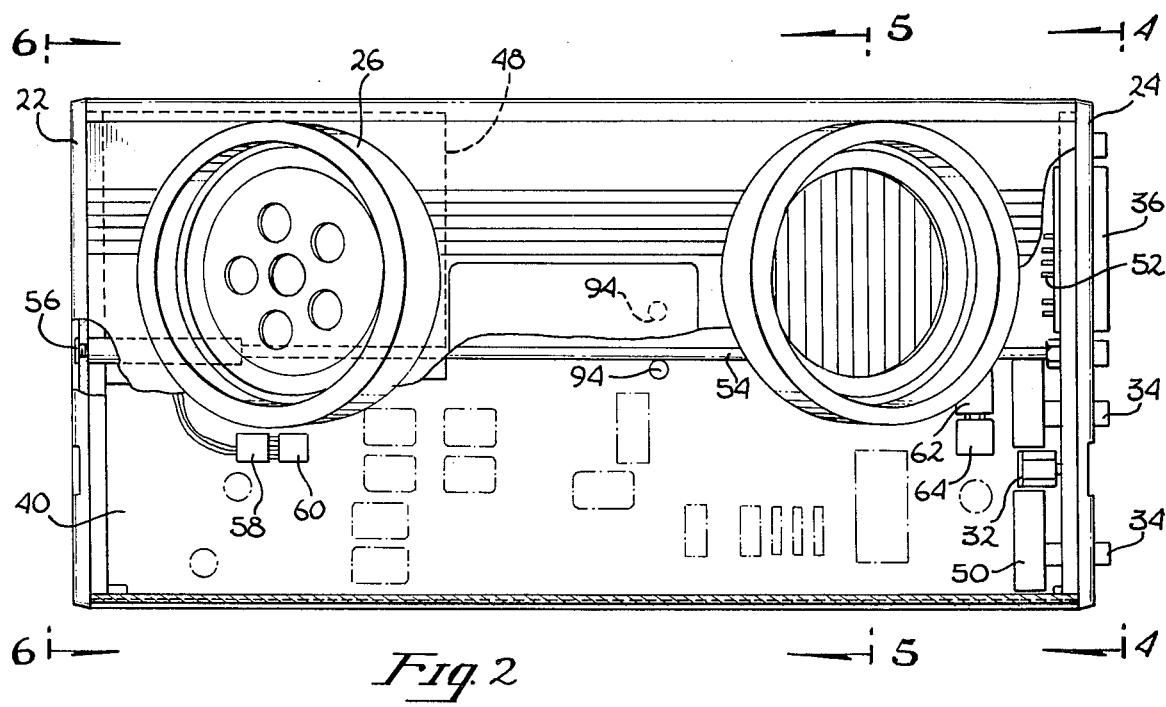
FIG. 2 is the top view partially cut away of the embodiment of FIG. 1.
Figure 3:
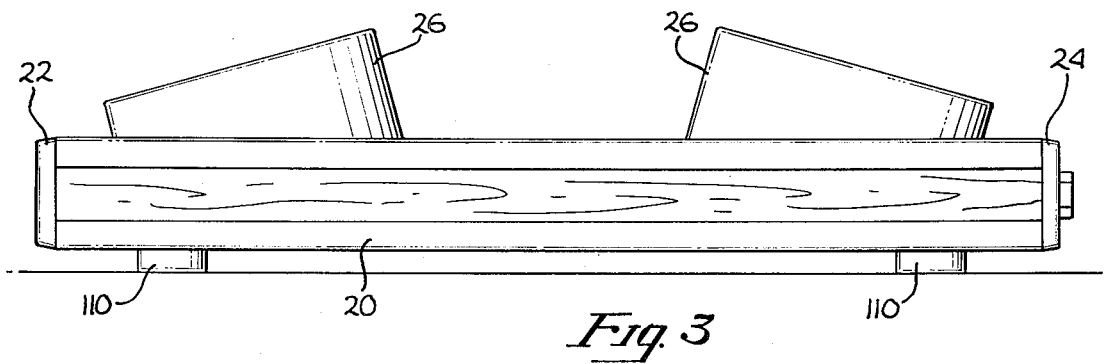
FIG. 3 is a side view of the embodiment of FIG. 1.
Figure 4:
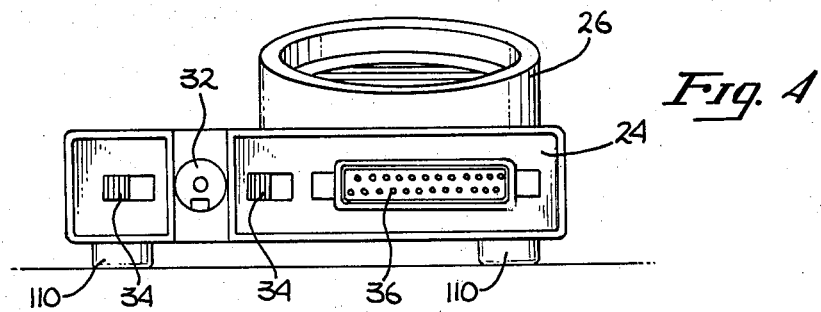
FIG. 4 is the first end view of the embodiment 1.
Figure 5:
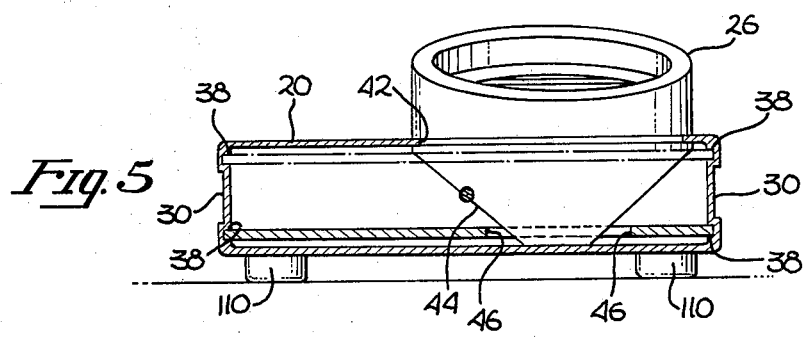
FIG. 5 is a partial cross section taken along line 5—5 of FIG. 2.
Figure 6:
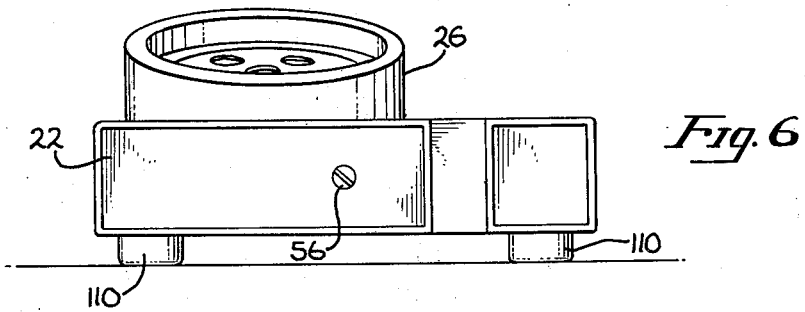
FIG. 6 is a second end view of the embodiment of FIG. 1.

Now referring to FIG. 5, a cross section taken through line 5—5 of FIG. 2 may be seen. This cross section illustrates the characteristic cross section of the central body member 20. Specifically in the preferred embodiment, the central body member 20 is an extrusion member having a uniform cross section along its entire length, that cross section being characterized by an approximately rectangular section having a pair of slots 38 on each side of the oppositely disposed inner walls thereof for receipt and support of the edges of one or more printed circuit boards 40, and of course the slots 30 on the outer walls thereof, which as subsequently shall be seen, serve both decorative and functional purposes. In production, of course, the extruded section, preferably a plastic extrusion such as polyvinyl chloride or ABS, is extruded in substantial lengths and then cut into the particular lengths desired for a particular application. In that regard, obviously different electronic circuits may be packaged using the same basic extrusion by cutting the extrusion to different lengths as required, thereby allowing multiple use of the same packaging tooling. For the modems disclosed in the figures, after the extrusion is cut to length a pair of holes 42 (see FIG. 5 and indirectly FIGS. 1 through 4 and 6) are cut in the upper face surface of the extrusion for receipt of the two muffs 26. The muffs themselves are relatively standard construction, comprising an outer rubber member receiving and retaining an electromagnetic transducer for sonic tone generation and/or reception. However, unlike conventional muffs, they each contain a groove in the outer periphery thereof to retain them in the holes 42 (FIG. 5) in the upper surface of the central body member, once forced into that position. Thus, in assembly no screws, clamps or cement is required to assemble the muffs to the package but instead the muffs may be assembled to the body member 20 by a combination of pushing and twisting until they snap into position.

In the embodiment disclosed in FIGS. 1 through 6, the electronic circuit board itself is fabricated using conventional integrated circuit board fabrication techniques, of course using a printed circuit board layout compatible with the physical dimensions of the extrusion with which it will be used. Further, for packages such as the modems disclosed herein, the lower portion 44 of the muffs (see FIG. 5) extends downward to the lower wall of the extrusion. In such cases, the printed circuit board should also be configured to allow clearance for such devices. In that regard, it will be noted that the printed circuit board 40 is provided with a hole 46 to allow clearance for the lower portion of one of the muffs 26 (see FIG. 5), with the other end of the printed circuit board in the region of the other muff being cut away (see the edge of the printed circuit board 48 shown in phantom in FIG. 2) for appropriate clearance.

In the embodiments shown in FIGS. 1 through 6, switch actuating members 34 (FIG. 1) actually comprise part of switches 50 which are mounted directly to the printed circuit board 40 so that no assembly of the switches to the end cap 24 is required. Similarly, the leads 52 for connector 36 are bent downward at right angles and are soldered to a printed circuit board 40 in the normal manner so that the connector itself is supported by the printed circuit board. In addition, the connector 36 is fastened to the end cap 24 with a threaded connection in the usual manner, with one of the threaded connections having an extention 54 extending to the opposite end of the package for receipt of the screw 56 to hold the second end cap 22 in position. Thus in this embodiment, the printed circuit board is not actually fastened to the central extruded member 20 but instead is maintained in position by sliding in the slots of the central member 20 and being retained between the end caps 22 and 24, further being coupled to the end cap 24 through the connector 36.

In accordance with the previous description, the final assembly of the package, once the circuit has been tested, is accomplished by first twisting and pressing the left muff 26 (left as viewed from the top as in FIG. 2) into the corresponding opening in the extruded section 20. Thereafter the printed circuit board 40 with end cap 24 attached thereto is slid into position from the right hand end of the extrusion. At this stage, the transducer in the left hand muff electrically coupled to connector 58, may be connected to connector 60 previously soldered to the printed circuit board in the conventional manner. Thereafter the right hand muff may be twisted and pressed into position in the corresponding opening in the central member 20 and connector 62 coupled to the muff transducer and connector 64 on printed circuit board mated to complete the connection of the tone transducers to the electronic circuit. Finally, end cap 22 is placed in position and screw 56 tightened to complete the assembly. Thus, the entire final assembly is actually accomplished in this embodiment by a combination of various slip-together assemblies or components retained in the assembled state by the screw 56.

With the assembly hereinbefore described, disassembly and reassembly may be readily accomplished if for any reason disassembly is subsequently required. It should be noted, however, that other means of fastening the end caps to the central body member may also be used depending on the materials of the various components. By way of specific example, one or more screws may extend through a wall of the central body member 20 adjacent each end thereof to engage a mating hole or slot in the inner portion of the adjacent end cap, or for permanent assembly where plastic end caps are used, one or both end caps may be solvent welded to the central body member. Finally, of course the printed circuit board may be fastened to either end cap by appropriately disposed screws, or even fastened to the central body member by one or more screws if desired, though such retention of the printed circuit board is generally not required and only adds an increment of cost to the otherwise low cost packaging technique.

Figure 7:
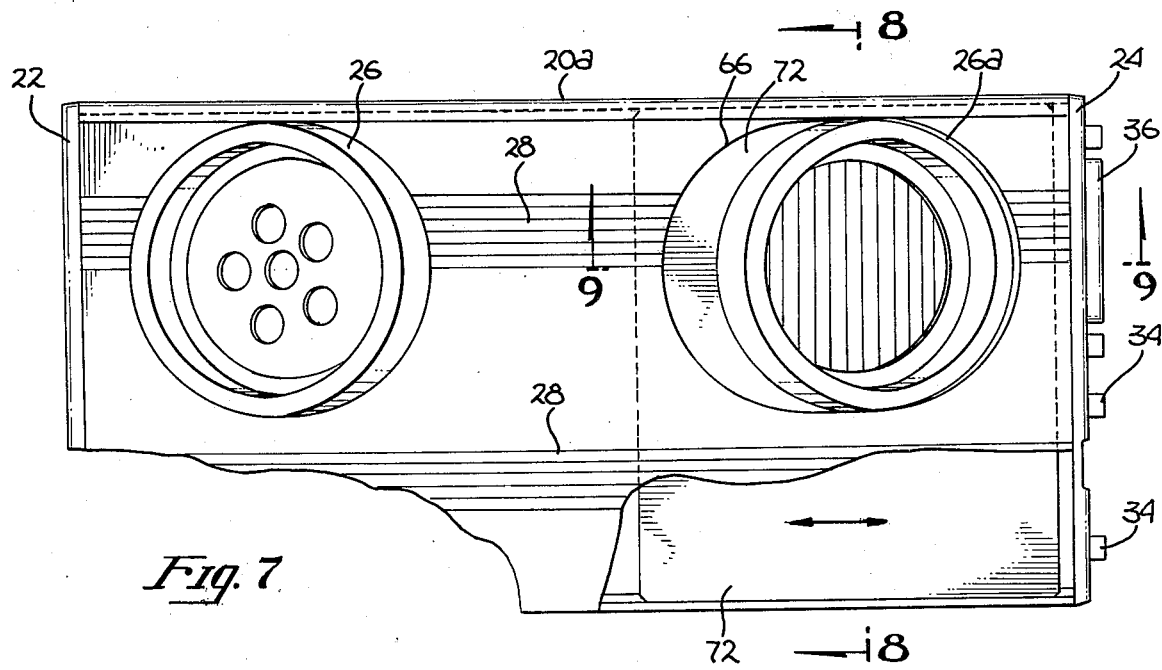
FIG. 7 is a top view partially cut away of an alternate embodiment.

Now referring to FIGS. 7 through 9, an alternate embodiment modem package may be seen. This package is intended to provide variable muff spacing, angular orientation and size to accomodate telephone receivers of corresponding variations. In particular while telephone receivers are standard throughout the United States and Canada, the size, spacing and angular relationship between the mouth piece and ear piece of phones in Europe vary from country to country so that the adjustability in these parameters provided by this embodiment makes this embodiment suitable for the European market. In this design, substantially identical packaging techniques may be used as in the previously described embodiment. Thus common parts, such as the end caps, etc. are identified by the same numerals as in the previously described embodiment. Parts identified by the same numerals followed by the letter a are the functional equivalent of the parts identified by the same numeral in the earlier embodiment, though may include some variation in size, etc. for functional reasons. Thus in the embodiment of FIGS. 7 through 9, the central body member 20a may be a section of the same extrusion as used for the body member 20 by the previously described embodiment, though the opening 66 for at least one of the muffs 26a is an elongated opening having a width to accomodate the muff and a length adequate to allow the longitudinal adjustment in the position of the muff to accomodate the desired range in muff spacing for the phone receivers with which the modem is to be used. The muff 26a is preferably proportioned to accept the largest mouth piece (or ear piece) with which the modem may be used, with a selection of inserts 68 (see FIG. 10) being provided to fit on or within the muffs to match smaller receiver proportions. Further, the angle of the muffs α (see FIG. 9) should be equal to the maximum angle of the corresponding receivers with which the modem will be used, even though the maximum angle may not necessarily coincide with the maximum muff size. Rather than snapping into the opening in the central body member 20a, as in the previously described embodiment, the muff 26a snaps within an appropriately sized opening in a slide plate 70. This slide plate slides within the upper set of slots 38 in the extrusion 20a and is formed in the shape of a shallow channel so that the upper face 72 thereof slides along the adjacent inner face of the central member 20a so that entrance of foreign matter between these two parts is prevented. Thus since the muff is only connected to the printed circuit board through flexible leads anyway, the muff 26a is free to slide with the slide plate 70 to adjust the separation in the two muffs. (Obviously of course, both muffs may be made adjustable in position in the manner described, though greater simplicity in the structure results if the full range of required adjustability is provided on the single muff.)

It was previously mentioned that the angle α (FIG. 9) should be at least equal to the maximum angle required. To adjust the angle for receivers of lesser angularity, the two muffs may be rotated about vertical axes by an angle generally in the range of 0 to 90 degrees (see FIG. 8). In particular, when the muffs are in the position or angular orientation illustrated with respect to FIGS. 7 and 9, they will effectively be at their maximum relative angularity, though when the muffs are rotated in opposite directions by 90 degrees the top surfaces of the muffs and the faces of the electromagnetic transducers therein will be parallel to each other, though of course both will be inclined by the angle α as indicated in phantom in FIG. 8. In that regard since a 90 degree angular rotation is all that is required to provide the full range of adjustability in the relative angularity between the two muffs, mechanical limits of any convenient design may be incorporated to prevent the continuous rotation of the muffs and possible damage or the uncoupling of the electromagnetic transducer connections.

Now referring to FIGS. 11 and 12, another embodiment for the present invention may be seen. This embodiment is an electrically coupled or direct coupled modem as opposed to an acoustic coupled modem, and accordingly no phone muffs are used. Thus while the same extruded central section may be used for the central body section 20b, the rear end cap 22a is provided with an appropriate connector 74 for coupling to the electronic equipment and a conventional phone coupling 76, shown in phantom, for direct coupling to the phone line. The front end of the modem package, however, is enclosed by an end cap 78, provided with appropriate supports for a small printed circuit board 80 therein. The end cap 78 may be solvent welded in position or connected by some other means, such as by way of example screws 82, and when so connected to the central body member 20b will maintain the main printed circuit board 40a between the two end caps. A final closure cap 84 having appropriately disposed openings for switch accuators 86, may be solvent welded or otherwise fastened to the cap 78 to hold the circuit board 80 and the switches 88 thereon in position within the cap without separate mechanical connections. In that regard, the printed circuit board 80 could be an extension of the printed circuit board 40a, though the use of a separate printed circuit board allows the inclination of the switches 88 for better esthetics and more convenient operation of the switches, with the printed circuit board 80 being coupled to the main printed circuit board 40a through a flex ribbon 90. Also in this embodiment, printed circuit board 80 includes a cluster of light-emitting diode indicators, with the closure plate 84 having a plurality of openings in region 92 just above the LED's. Thus, a final semitransparent decal having the same color as the LED's and having black printing thereon identifying the switches and the meaning of each LED indicator may be placed on closure member 84 to identify the switches as shown in FIG. 11 and to display and identify the meaning of each LED when it is turned on, though leaving each other indicator LED and its functional identification effectively invisible when not on. In that regard, even the embodiment of FIGS. 1 through 6 may have indicator light-emitting diodes 94 (see FIG. 2) mounted on the printed circuit board 40 so as to be viewable through appropriately disposed holes in the top of central body member 20, again covered by an appropriate decal 96 to make them invisible when not on and to identify them when they are turned on.

Now referring to FIGS. 13 and 14 still another embodiment of the present invention may be seen. In this embodiment the same central extrusion may be used, though the end caps 24a and 22b are slightly modified for the specific application. In particular, this embodiment is intended to slide into a panel mount generally indicated by the numeral 94 being stamped and formed to provide a pluarlity of pairs of parallel spaced apart channel-like protursions 96 for fitting within the slots 30 on the central body members 20c to guide, support and align each of the modems in the rack. In a typical installation the end cap 22b will have edge slots 96, corresponding to the channel 30 on the sides of the central body member 20c, and further will have some suitable connector or in this embodiment an appropriate opening 98 so that edge connectors positioned on the back of the rack may mate with an extension 100 of the printed circuit board to automatically make electrical connection therewith. The forward end cap 24a, on the other hand, in such an embodiment will typically expose an on/off switch 102 on the printed circuit board therewithin, as well as a conventional telephone interconnect plug 104 so that each modem may be separately coupled to a phone line. Such a packaging arrangement provides for convenient rack mount of any plurality of modems (or electronic circuits in general) while still providing protection of the circuits, particularly before being installed in the rack or after being removed therefrom.

Now referring to FIG. 15, one further application of the present invention may be seen. In particular, a plurality of individual electronic packages 106 may be clamped by simple extruded plastic clamps 108 to form a single assembly of compact size and for convenient interconnection. Obviously such packaging techniques can be used with packages having various control switches, etc., as has been illustrated with respect to FIGS. 13 and 14. In a free standing assembly of this character, rubber feet 108 may be provided on the bottom unit as is conventional for free standing electronic gear. In that regard, it will be noted that similar rubber feet have been provided for each of the embodiments of FIGS. 1 through 12, as all such embodiments are intended as free standing electronic packages.

There has been disclosed herein a unique form of electronics package which provides a highly functional and esthetically pleasing package utilizing low cost parts and simply and quick assembly techniques. By standardizing the central body section, the function and size of the package may be varied greatly by changing the length of the package, varying the end caps, etc. while still retaining all the esthetic and functional advantages of the invention, whether for free standing, or rack or panel mount applications. In that matter, it will be noted that the end caps 22 and 24 are all substantially the same, and in fact could be injection molded using the same tooling by merely providing inserts as required to define the switch openings, connector openings, etc. In the embodiments disclosed herein, the central section has two pair of internal slots which have been used to support two printed circuit boards within the same enclosure, as well as providing a means for supporting the adjustable muff support of the embodiment of FIGS. 7 through 9. Obviously however, extrusions carrying greater numbers of slot pairs may also be used, though the ability to stack the packages of the present invention, as illustrated with respect to FIGS. 13 through 15, mitigates against a capability of mounting large numbers of printed circuit boards within the same enclosure. In that regard, in the event circuits packaged within the package of the present invention dissipate substantial heat, ventilation holes may be provided in the extrusion, though the present invention is particularly well suited for packaging lower power dissipation circuits where no such ventilation is required. Further, while the decorative strips placed in the side regions 30 of the central extrusions may be separate strips cut and placed therein, being retained therein by the wedge-like shape of the slot walls, it is preferred to hot stamp or lay in wood grain tape at the time the extrusion is formed, as such processes may be done automatically at extremely low cost. Finally, referring to FIG. 16 an alternate form for the adjustment of the muff angularity may be seen. In this figure, a partial cross section of a modem is shown having a gimbal ring 112 supporting the muff 26a on an inwardly directed flange 114. The gimbal ring 112 in turn has a pair of gimbal pins or pivots 116 (only one being shown in FIG. 16) fitting within a local depression 118 on slide plate 72a. In this manner, the muff may be adjusted in angularity about a horizontal axis, as shown in FIG. 16, rotating on the gimbal pins 116 but otherwise being retained within the local depression 118 on the slide plate. The side plate, of course, together with the gimbal ring may be adjusted in relative position with respect to the second muff so that both spacing and angularity are adjustable. In that regard, both muffs may be mounted in the manner described, using two separate slide plates 72a so that the angularity of both muffs may be adjusted whether or not both actually have sufficient freedom so as to have substantial longitudinal adjustability. (For assembly purposes, the top of the gimbal ring 112 is approximately flush with the inner surface of the central body section so that the gimbal ring and slide plate may be slid into position under the respective hole prior to pushing the muff into position onto the gimbal ring.) Thus, while alternate forms of packages and assembly techniques have alternate forms of packages and assembly techniques have been specifically disclosed herein, it will be understood by those skilled in the art that various changes in the form and detail of the invention disclosed may readily be made by those skilled in the art without departing from the spirit and scope of the invention.

I claim:

1. A modem comprising:

an extruded plastic central body having first and second open ends and an approximately rectangular section defining inner and outer section surfaces, said inner section surface having at least two facingly disposed slots formed therein for receiving and supporting the side edges of at least one printed circuit board within said central body, said central body having a pair of openings on the top surface thereof, at least one printed circuit board fitting within said two facingly disposed slots in central body, a first and second muff, each fitting within one of said pair of openings on the top surface of said central body and being electrically coupled to said modem circuit board, a first end cap having a portion thereof fitting within said first end of said central body for alignment therewith, said first end cap enclosing at least a substantial portion of said first end of said central body, a second end cap having a portion thereof fitting within said second end of said central body for alignment therewith, said second end cap enclosing at least a substantial portion of said second end of said central body, at least one of said end caps having an opening for electrical connection to said printed circuit board therein, and retaining means for retaining said first and second end caps on said first and second ends, respectively, of said central body.

2. The modem of claim 1 wherein said retaining means comprises means coupling said first and second end caps to each other to clamp said end caps to said central body therebetween.

3. The modem of claim 1 wherein said retaining means comprises screws coupling at least one end of said central body to the adjacent said end cap.

4. The modem of claim 1 wherein at least one of said end caps has openings therein for the protrusion of switch actuating members of switches coupled to said printed circuit board, 5. The modem of claim 1 wherein at least one of said end caps includes means for mechanically coupling and providing access to the connector on a circuit board within the modem, whereby said circuit board may be mechanically fastened to said end cap through said connector.

6. The modem of claim 1 wherein one of said end caps has an opening to receive a partial extension of said printed circuit board within the mode, whereby an edge connector may extend into said opening and make electrical connections with said circuit board.

7. The modem of claim 1 further comprised of a second printed circuit board and wherein one of said end caps comprises a hollow member receiving and supporting said second circuit board in a position angularly inclined with respect to said at least two facingly disposed slots in said central body, said hollow member further having openings for the protrusion of switch actuating members on switches coupled to said second circuit board therein.

8. The modem of claim 1 wherein said muffs each comprise a rubber body member having a groove in the outer surface thereof, each fitting within one of said openings on the top surface of said central body so as to be retained thereby.

9. The modem of claim 1 wherein said at least two facingly disposed slots in said central body comprises at least four facingly disposed slots formed therein, and further comprised of a slide plate, at least one of said pair of openings on the top surface of said central body extending to allow the movement of said first muff fitting therein toward and away from said second muff, said slide plate fitting within two of said facingly disposed slots in said central body so as to be slideable therein generally toward and away from said second muff, said first muff being coupled to said slide plate so as to be slideable therein to adjust the spacing of said muffs.

10. The modem of claim 9 wherein said first muff comprises a rubber body member having a groove in the outer surface thereof, said slide plate having an opening therein within which said groove in said first muff fits so as to be retained thereby.

11. The modem of claim 10 wherein said second muff comprises a rubber body member having a groove therein for fitting within one of the openings in said central body, said groove in each said muff being angularly inclined with respect to the phone receiver mating surfaces thereof, each muff being electrically coupled to said circuit board through lead wires, whereby said muffs may also be rotated to vary the relative angle therebetween.

12. The modem of claim 9 further comprised of a support member, having a support axis, said support member being coupled to said first muff and supported by said slide plate so as to be adjustable in angular orientation about said support axis.

13. The modem of claim 12 wherein each said muff is coupled to said support member so as to be adjustable in angular orientation.

* * * * *